United States Patent
Hu et al.

(10) Patent No.: US 10,127,192 B1
(45) Date of Patent: Nov. 13, 2018

(54) ANALYTIC SYSTEM FOR FAST QUANTILE COMPUTATION

(71) Applicant: SAS Institute Inc., Cary, NC (US)

(72) Inventors: Xiangqian Hu, Cary, NC (US); Xinmin Wu, Cary, NC (US); Tao Wang, Cary, NC (US); Xunlei Wu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/961,373

(22) Filed: Apr. 24, 2018

Related U.S. Application Data

(60) Provisional application No. 62/563,142, filed on Sep. 26, 2017.

(51) Int. Cl.
*G06F 7/00* (2006.01)
*G06F 17/18* (2006.01)

(52) U.S. Cl.
CPC .................................. *G06F 17/18* (2013.01)

(58) Field of Classification Search
CPC ....................................................... G06F 17/18
USPC ........................................................ 708/207
See application file for complete search history.

(56) References Cited

U.S. PATENT DOCUMENTS

| | | | |
|---|---|---|---|
| 5,018,088 A | | 5/1991 | Higbie |
| 5,734,744 A | | 3/1998 | Wittenstein et al. |
| 6,552,266 B2 * | | 4/2003 | Carden ............... H01L 21/50 |
| | | | 174/535 |
| 6,985,467 B2 | | 1/2006 | Lomp et al. |
| 7,020,111 B2 | | 3/2006 | Ozluturk et al. |
| 7,162,249 B2 | | 1/2007 | Westphal |
| 7,219,034 B2 | | 5/2007 | McGee et al. |
| 7,409,357 B2 | | 8/2008 | Schaf et al. |
| 8,611,586 B1 | | 12/2013 | Brodeur et al. |
| 8,868,573 B2 | | 10/2014 | Chu et al. |
| 9,703,852 B2 * | | 7/2017 | Blanc ............... G06F 17/30575 |
| 2003/0118232 A1 | | 6/2003 | Li et al. |
| 2006/0101048 A1 * | | 5/2006 | Mazzagatti ....... G06F 17/30327 |
| 2009/0222243 A1 | | 9/2009 | Zoldi et al. |

(Continued)

OTHER PUBLICATIONS

EViews Help: Quantile Regression, http://www.eviews.com/help/helpintro.html, Available Jun. 21, 2017.

(Continued)

*Primary Examiner* — Tan V. Mai
(74) *Attorney, Agent, or Firm* — Bell & Manning, LLC

(57) ABSTRACT

A computing device computes a quantile value. A maximum value and a minimum value are computed for unsorted variable values. An upper bin value and a lower bin value are computed for each bin of a plurality of bins using the maximum and minimum values. A frequency counter is computed for each bin by reading the unsorted variable values a second time. Each frequency counter is a count of the variable values within a respective bin. A bin number and a cumulative rank value are computed for a quantile. The bin number identifies a specific within which a quantile value associated with the quantile is located. The cumulative rank value identifies a cumulative rank for the quantile value associated with the quantile. Frequency data is computed using the frequency counters. The quantile value is computed using the frequency data and the cumulative rank value for the quantile and output.

30 Claims, 9 Drawing Sheets

(56) References Cited

U.S. PATENT DOCUMENTS

| | | |
|---|---|---|
| 2010/0292995 A1 | 11/2010 | Bu et al. |
| 2012/0330714 A1 | 12/2012 | Malaviya et al. |
| 2013/0218908 A1 | 8/2013 | Chu et al. |
| 2013/0218909 A1 | 8/2013 | Chu et al. |
| 2013/0325825 A1 | 12/2013 | Pope et al. |
| 2015/0006111 A1 | 1/2015 | Wynter et al. |
| 2015/0254709 A1 | 9/2015 | Carlyle et al. |
| 2016/0246853 A1* | 8/2016 | Guirguis .......... G06F 17/30545 |
| 2017/0213257 A1 | 7/2017 | Murugesan et al. |

OTHER PUBLICATIONS

A. Antonov, Quantile regression through linear programming, Dec. 16, 2013.

Quantreg(x,y,tau,order,Nboot)—File Exchange—MATLAB Central, http://www.mathworks.com/matlabcentral/fileexchange/32115-quantreg-x-y-tau-order-nboot-?requestedDomain=true, Mar. 16, 2015.

Quantile_regression, http://www.statsmodels.org/devel/examples/notebooks/generated/quantile_regression.html, Available Jun. 21, 2017.

R. Koenker, Quantile Regression in R: A Vignette, Jul. 2010.

R. Koenker, CRAN—Package quantreg, Apr. 18, 2017.

Koenker et al., Regression Quantiles, Econometrica, vol. 46, No. 1, Jan. 1978, pp. 33-50.

Gutenbrunner et al., Regression Rank Scores and Regression Quantiles, The Annals of Statistics, vol. 20, No. 1, Mar. 1992, pp. 305-330.

Qreg—Quantile regression, stata.com, Available Jun. 21, 2017.

Portnoy et al., The Gaussian Hare and the Laplacian Tortoise: Computability of Squared—Error versus Absolute-Error Estimators, Statistical Science, vol. 12, No. 4., Nov. 1997, pp. 279-296.

R: The R Project for Statistical Computing, https://www.r-project.org/, Available Jun. 21, 2017.

SAS Institute Inc. 2016. SAS® Visual Data Mining and Machine Learning 8.1: Statistics Programming Guide. Cary, NC: SAS Institute Inc, Sep. 2016.

SAS Institute Inc. 2016. SAS® Visual Data Mining and Machine Learning 8.1: Statistical Procedures. Cary, NC: SAS Institute Inc., Chapter 9 The QTRSELECT Procedure, Sep. 2016.

SAS Institute Inc. 2015. SAS/STAT® 14.1 User's Guide. Cary, NC: SAS Institute Inc, Jul. 2015.

G. Guirguis, Conformal Mapping: A Robust Method for Computing Quantiles, Communications in Statistics—Simulation and Computation, vol. 33, No. 4, (2004), pp. 991-1006.

K. Raatikainen, Simultaneous estimation of several percentiles, Simulation, Oct. 1987, pp. 159-163.

Jain et al., The $P^2$ Algorithm for Dynamic Calculation of Quantiles and Histograms Without Storing Observations, Simulation Modeling and Statistical Computing, vol. 28, No. 10, Oct. 1985, pp. 1076-1085.

* cited by examiner

ANALYTIC SYSTEM FOR FAST QUANTILE COMPUTATION

CROSS-REFERENCE TO RELATED APPLICATIONS

The present application claims the benefit of 35 U.S.C. § 111(e) to U.S. Provisional Patent Application No. 62/563,142 filed on Sep. 26, 2017, the entire contents of which are hereby incorporated by reference.

BACKGROUND

Quantiles (or percentiles) are essential statistical descriptions for data. They provide a numerical and an accurate view of data and the shape of a data distribution. However, computing exact quantiles for distributed data systems and/or big data environments remains challenging because data stored in different computing nodes and the amount of data prevents sorting, which is commonly used to compute the quantiles.

SUMMARY

In an example embodiment, a non-transitory computer-readable medium is provided having stored thereon computer-readable instructions that, when executed by a computing device, cause the computing device to compute a quantile value. A maximum value and a minimum value are computed for a plurality of unsorted variable values of a variable read from a dataset. An upper bin value and a lower bin value are computed for each bin of a plurality of bins using the computed maximum value and the computed minimum value. A frequency counter is computed for each bin of the plurality of bins by reading the plurality of unsorted variable values of the variable from the dataset a second time. Each frequency counter is a count of the variable values within a respective bin based on a variable value between the computed upper bin value and the computed lower bin value of the respective bin. A bin number and a cumulative rank value are computed for a quantile using the frequency counter for each bin of the plurality of bins. The bin number identifies a specific bin of the plurality of bins within which a quantile value associated with the quantile is located. The cumulative rank value identifies a cumulative rank for the quantile value associated with the quantile. Frequency data for each unique value of the variable values read from the dataset that is between the computed upper bin value and the computed lower bin value of the computed bin number is computed by reading the plurality of unsorted variable values of the variable from the dataset a third time. The frequency data includes a variable value and a number of occurrences of the variable value for each unique value. The quantile value associated with the quantile is computed using the computed frequency data and the computed cumulative rank value for the quantile. The computed quantile value is output.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to compute a quantile value.

In yet another example embodiment, a method of computing a quantile value is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
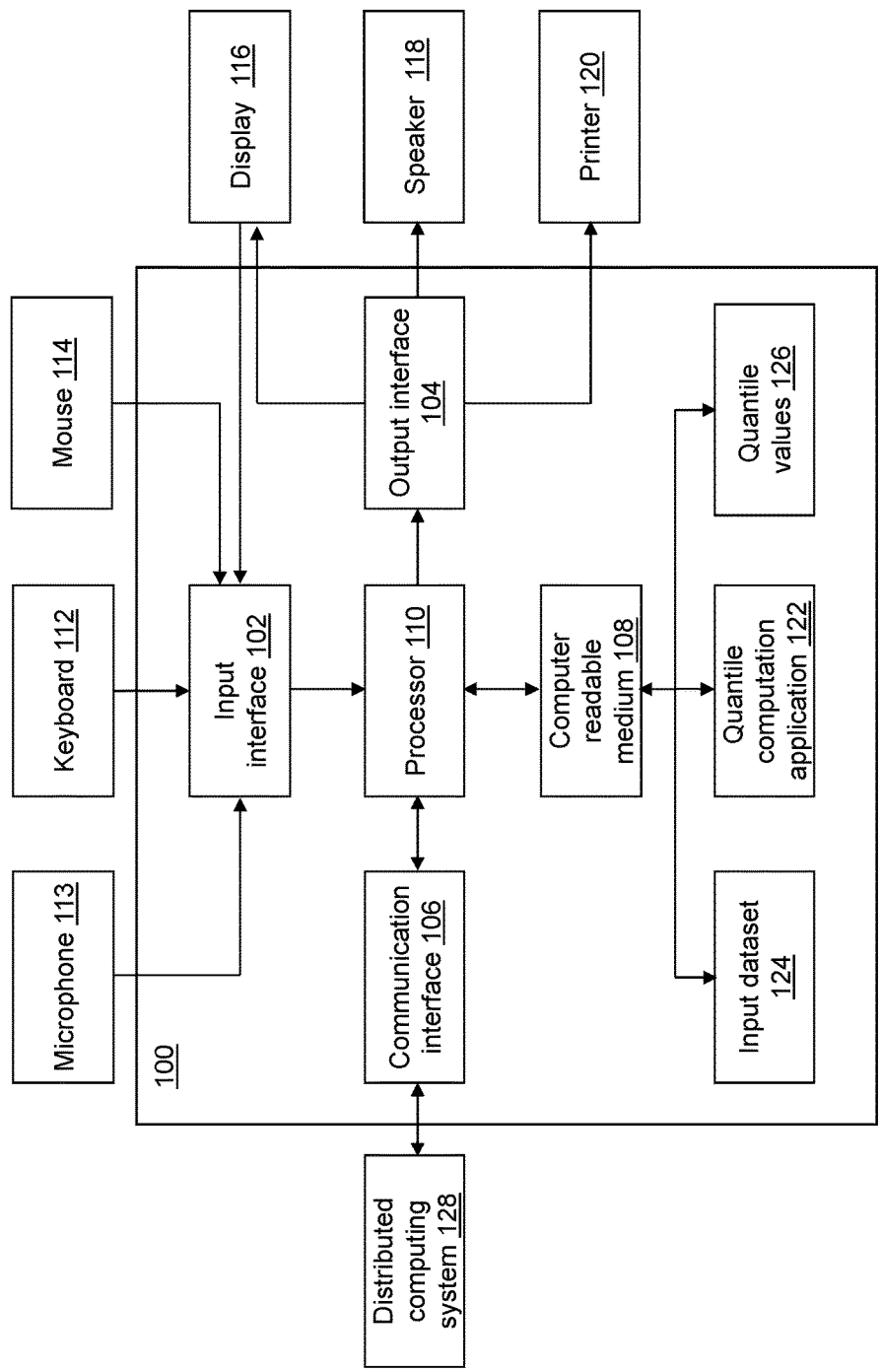
FIG. 1 depicts a block diagram of a quantile computation device in accordance with an illustrative embodiment.

Referring to FIG. 1, a block diagram of a quantile computation device 100 is shown in accordance with an illustrative embodiment. Quantile computation device 100 may compute a quantile value for each quantile of one or more quantile values. Quantile computation device 100 may include an input interface 102, an output interface 104, a communication interface 106, a non-transitory computer-readable medium 108, a processor 110, a quantile computation application 122, an input dataset 124, quantile values 126, and frequency data. Fewer, different, and/or additional components may be incorporated into quantile computation device 100.

Quantile computation application 122 provides an efficient and exact method to locate quantiles in at most three passes through input dataset 124 that may be distributed or classified as "big data" due to the large number of values of the variable. Quantile computation application 122 avoids non-convergence situations that may occur using the iterative algorithm (the percentile action) and does not need expensive sorting that may occur using the sorting-based algorithm (the aggregate action). Therefore, quantile computation application 122 is an improvement to existing processes performed by computing devices in solving the technical problem of computing quantiles from a dataset. Quantile computation application 122 does not require a stopping criterion such as a number of iterations or a convergence tolerance for which values may be difficult to define. Quantile computation application 122 also computes an exact quantile for any distributed or big data with comparable or significantly less computational cost compared with existing methods.

Input interface 102 provides an interface for receiving information from the user or another device for entry into quantile computation device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into quantile computation device 100 or to make selections presented in a user interface displayed on display 116.

The same interface may support both input interface 102 and output interface 104. For example, display 116 comprising a touch screen provides a mechanism for user input and for presentation of output to the user. Quantile computation device 100 may have one or more input interfaces that use the same or a different input interface technology. The input interface technology further may be accessible by quantile computation device 100 through communication interface 106.

Output interface 104 provides an interface for outputting information for review by a user of quantile computation device 100 and/or for use by another application or device. For example, output interface 104 may interface with various output technologies including, but not limited to, display 116, a speaker 118, a printer 120, etc. Quantile computation device 100 may have one or more output interfaces that use the same or a different output interface technology. The output interface technology further may be accessible by quantile computation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Quantile computation device 100 may have one or more communication interfaces that use the same or a different communication interface technology. For example, quantile computation device 100 may support communication using an Ethernet port, a Bluetooth antenna, a telephone jack, a USB port, etc. Data and messages may be transferred between quantile computation device 100 and another computing device of distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Quantile computation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Quantile computation device 100 also may have one or more drives that support the loading of a memory media such as a CD, DVD, an external hard drive, etc. One or more external hard drives further may be connected to quantile computation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Quantile computation device 100 may include a plurality of processors that use the same or a different processing technology.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency response variables and improvements throughout various parts of the system.

Quantile computation application 122 performs operations associated with defining frequency data and quantile values 126 from data stored in input dataset 124. Quantile values 126 define a variable value of input dataset 124 that is associated with each quantile of one or more quantiles computed by ranking the variable values of input dataset 124. Some or all of the operations described herein may be embodied in quantile computation application 122. The operations may be implemented using hardware, firmware, software, or any combination of these methods.

Referring to the example embodiment of FIG. 1, quantile computation application 122 is implemented in software (comprised of computer-readable and/or computer-executable instructions) stored in computer-readable medium 108 and accessible by processor 110 for execution of the instructions that embody the operations of quantile computation application 122. Quantile computation application 122 may be written using one or more programming languages, assembly languages, scripting languages, etc. Quantile computation application 122 may be integrated with other analytic tools. As an example, quantile computation application 122 may be part of an integrated data analytics software application and/or software architecture such as that offered by SAS Institute Inc. of Cary, N.C., USA. Merely for illustration, quantile computation application 122 may be implemented using or integrated with one or more SAS software tools such as Merely for illustration, performance analysis application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are applicable in a wide variety of industries to solve technical problems.

Quantile computation application 122 may be implemented as a Web application. For example, quantile computation application 122 may be configured to receive hypertext transport protocol (HTTP) responses and to send HTTP requests. The HTTP responses may include web pages such as hypertext markup language documents and linked objects generated in response to the HTTP requests. Each web page may be identified by a uniform resource locator that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. An observation vector is defined as $x_j$ that may include a value for each of the plurality of variables associated with the observation j. Each variable of the plurality of variables may describe a characteristic of a physical object. For example, if input dataset 124 includes data related to operation of a vehicle, the variables may include an oil pressure, a speed, a gear indicator, a gas tank level, a tire pressure for each tire, an engine temperature, a radiator level, etc. Input dataset 124 may include data captured as a function of time for one or more physical objects.

The data stored in input dataset 124 may be generated by and/or captured from a variety of sources including one or more sensors of the same or different type, one or more computing devices, etc. The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing.

Input dataset 124 may be stored on computer-readable medium 108 and/or on one or more computer-readable media of distributed computing system 128 and accessed by quantile computation device 100 using communication interface 106, input interface 102, and/or output interface 104. Data stored in input dataset 124 may be sensor measurements or signal values captured by a sensor, may be generated or captured in response to occurrence of an event or a transaction, generated by a device such as in response to an interaction by a user with the device, etc. The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 124 may be captured at different time points periodically, intermittently, when an event occurs, etc. One or more columns of input dataset 124 may include a time and/or date value.

Input dataset 124 may include data captured under normal operating conditions of the physical object. Input dataset 124 may include data captured at a high data rate such as 200 or more observation vectors per second for one or more physical objects. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

Input dataset 124 may be stored using various data structures as known to those skilled in the art including one or more files of a file system, a relational database, one or more tables of a system of tables, a structured query language database, etc. on quantile computation device 100 and/or on distributed computing system 128. Quantile computation device 100 may coordinate access to input dataset 124 that is distributed across distributed computing system 128 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS® Viya™ open, cloud-ready, in-memory architecture also may be used as an analytic platform to enable multiple users to concurrently access data stored in input dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Referring to FIGS. 2A, 2B, and 3 to 9, example operations associated with quantile computation application 122 are described. Quantile computation application 122 may be used to create quantile values 126 from input dataset 124. Quantile computation application 122 may be executed directly by the user or may be called by another application with a request to compute one or more quantile values. Additional, fewer, or different operations may be performed depending on the embodiment of quantile computation application 122. The order of presentation of the operations of FIGS. 2A, 2B, and 3 to 9 is not intended to be limiting. Some of the operations may not be performed in some embodiments. Although some of the operational flows are presented in sequence, the various operations may be performed in various repetitions, concurrently (in parallel, for example, using threads and/or distributed computing system 128), and/or in other orders than those that are illustrated. For example, a user may execute quantile computation application 122, which causes presentation of a first user interface window, which may include a plurality of menus and selectors such as drop-down menus, buttons, text boxes, hyperlinks, etc. associated with quantile computation application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by quantile computation application 122.

Figure 2A:
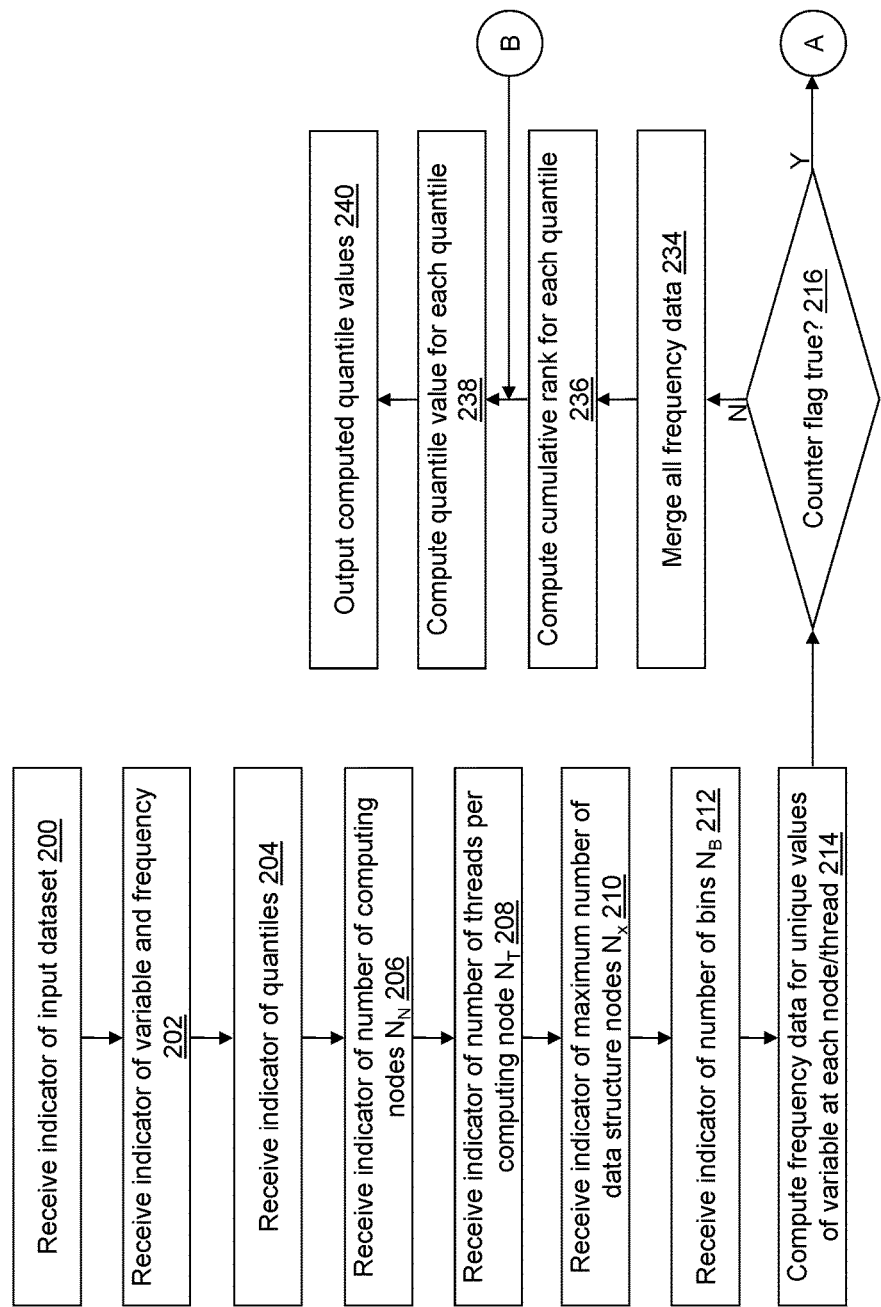
FIGS. 2A, 2B, and 3 to 9 depict flow diagrams illustrating examples of operations performed by the quantile computation device of FIG. 1 in accordance with an illustrative embodiment.

Referring to FIG. 2A, in an operation 200, a first indicator may be received that indicates input dataset 124. For example, the first indicator indicates a location and a name of input dataset 124. As an example, the first indicator may be received by quantile computation application 122 after selection from a user interface window, after entry by a user into a user interface window, by extracting the information from a request, by reading an input file, etc. In an alternative embodiment, input dataset 124 may not be selectable. For example, a most recently created dataset may be used automatically.

In an operation 202, a second indicator may be received that indicates variable x and a frequency value for variable x in input dataset 124. For example, the second indicator may indicate a column number or a column name for each of variable x and the frequency value. As another option, a first pair or a last pair of columns of input dataset 124 may be assumed to be variable x and the frequency value. As an example, the second indicator may be received by quantile computation application 122 after selection from a user interface window, after entry by a user into a user interface window, by extracting the information from a request, by reading an input file, etc.

In an operation 204, a third indicator may be received that indicates a quantile for which to compute a value of the variable x associated with the quantile. The quantile is a value between zero and one exclusive. Alternatively, the quantile may be a percentile that is converted to a decimal value after receipt. A plurality of quantiles may be received. $N_Q$ is a number of the quantiles that may be one. Q references a set of the one or more quantiles indicated by the third indicator. For example, the plurality of quantiles may be a list of percentiles to compute provided by the user such as 0.15, 0.3, 0.35, 0.45, 0.5, 0.55, 0.75, where $N_Q=7$, and Q={0.15, 0.3, 0.35, 0.45, 0.5, 0.55, 0.75}. In an alternative embodiment, the third indicator may not be received. For example, a default value(s) may be stored, for example, in computer-readable medium 108 and used automatically. In another alternative embodiment, the quantile(s) may not be selectable. Instead, a fixed, predefined value may be used. For illustration, a default value of the one or more quantiles the set of quantiles Q={0.1, 0.2, 0.3, 0.4, 0.5, 0.6, 0.7, 0.8, 0.9}, where $N_Q=9$. One or more quantiles may be indicated using a variety of different methods. As an example, the third indicator may be received by quantile computation application 122 after selection from a user interface window, after entry by a user into a user interface window, by extracting the information from a request, by reading an input file, etc. If the one or more quantiles are not indicated in numerical order, the set of quantiles Q may be defined in numerical order based on the indicated numerical vales of the one or more quantiles. Q may be an array storing $N_Q$ values though different types of data structures may be used in alternative embodiments.

In an operation 206, a fourth indicator of a number of computing nodes $N_N$ of distributed computing system 128 may be received. In an alternative embodiment, the fourth indicator may not be received. For example, a default value may be stored, for example, in computer-readable medium 108 and used automatically. In another alternative embodiment, the number of computing nodes may not be selectable. Instead, a fixed, predefined value may be used. For illustration, a default value of the number of computing nodes may be one to indicate that quantile computation device 100 performs the operations of FIGS. 2A, 2B, and 3 to 9 without any other computing devices. As an example, the fourth indicator may be received by quantile computation application 122 after selection from a user interface window, after entry by a user into a user interface window, by extracting the information from a request, by reading an input file, etc.

In an operation 208, a fifth indicator of a number of threads $N_T$ may be received. In an alternative embodiment, the fifth indicator may not be received. For example, a default value may be stored, for example, in computer-readable medium 108 and used automatically. In another alternative embodiment, the number of threads may not be selectable. Instead, a fixed, predefined value may be used or may be determined based on a number of processors of quantile computation device 100. For illustration, a default value of the number of threads may be four. The number of threads may be available at each computing device of the number of computing nodes $N_N$. For example, using Hadoop, input dataset 124 may be split across a plurality of computing devices and further split across a plurality of threads at each computing device. As an example, the fifth indicator may be received by quantile computation application 122 after selection from a user interface window, after entry by a user into a user interface window, by extracting the information from a request, by reading an input file, etc.

In an operation 210, a sixth indicator of a maximum number of data structure nodes $N_x$ may be received. In an alternative embodiment, the sixth indicator may not be received. For example, a default value may be stored, for example, in computer-readable medium 108 and used automatically. In another alternative embodiment, the maximum number of data structure nodes may not be selectable. Instead, a fixed, predefined value may be used or may be determined based on an available memory of quantile computation device 100. For illustration, a default value for the maximum number of data structure nodes may be any value less than the amount of useable memory. As an example, the sixth indicator may be received by quantile computation application 122 after selection from a user interface window, after entry by a user into a user interface window, by extracting the information from a request, by reading an input file, etc.

In an operation 212, a seventh indicator of a number of bins $N_B$ may be received. In an alternative embodiment, the seventh indicator may not be received. For example, a default value may be stored, for example, in computer-readable medium 108 and used automatically. In another alternative embodiment, the number of bins may not be selectable. Instead, a fixed, predefined value may be used or may be determined based on an available memory of quantile computation device 100. For illustration, a default value for the number of bins may be 10,000. As an example, the seventh indicator may be received by quantile computation application 122 after selection from a user interface window, after entry by a user into a user interface window, by extracting the information from a request, by reading an input file, etc. In an alternative embodiment, the same value may be used for both $N_x$ and $N_B$ so that only one value is indicated.

In an operation 214, frequency data $T_{xkn}$ for unique values of the variable X may be computed by each thread k of the number of threads $N_T$ of each computing device n of the number of computing nodes $N_N$ of distributed computing system 128. Frequency data $T_{xkn}$ may be computed in a variety of manners. Frequency data $T_{xkn}$ may be stored as an array, a linked list, an AVL tree, a red-black tree, etc. In an illustrative embodiment, frequency data is stored using an ascending AVL tree. An AVL tree is a self-balancing binary search tree where a height of two child sub-trees of any node of the AVL tree differs by at most one. If at any time they differ by more than one, rebalancing is done to restore this property. Frequency data $T_{xkn}$ stores each unique value of the variable x and a frequency value that indicates a number of occurrences of the associated unique value in ascending order relative to the unique value. For illustration, example operations for computing frequency data $T_{xkn}$ are shown referring to FIG. 3.

In an operation 300, a data structure $T_{xkn}$ for frequency data, a unique value counter $N_U$, and a counter flag are initialized. For example, for an array type data structure for frequency data, memory is allocated for the array and array values are initialized to zero; for an AVL tree type data structure for frequency data, an empty tree is initialized; etc. The unique value counter may be initialized to zero, and the counter flag may be initialized to zero or FALSE.

In an operation 302, a variable value v for variable x and a frequency value for the variable value are read from input dataset 124.

In an operation 304, a determination is made concerning whether the unique value counter is less than the maximum number of data structure nodes N. When the unique value counter is less than the maximum number of data structure nodes $N_x$, processing continues in an operation 308. When the unique value counter is not less than the maximum number of data structure nodes $N_x$, processing continues in an operation 306.

In operation 306, the counter flag is set to one or TRUE, and processing continues in an operation 320 to indicate that the number of unique values of the variable x exceeds the maximum number of data structure nodes N.

In operation 308, a determination is made concerning whether the variable value exists in data structure $T_{xkn}$. When the variable value exists in data structure $T_{xkn}$, processing continues in an operation 310. When the variable value does not exist in data structure $T_{xkn}$, processing continues in an operation 312. For example, the read variable value is compared to existing keys of data structure $T_{xkn}$ that is an AVL tree to identify a matching key if it exists.

In operation 310, a frequency value associated with the existing variable value is updated in data structure $T_{xkn}$ by adding the read frequency value to the frequency value associated with the existing variable value, and processing continues in an operation 318.

In operation 312, the unique value counter is incremented by one to indicate that the read variable value is a new variable value.

In an operation 314, a new entry is created and added to data structure $T_{xkn}$. For example, a new AVL tree node is added in ascending order to data structure $T_{xkn}$ using the read variable value as a key so that the variable values are maintained in sorted order in data structure $T_{xkn}$.

In an operation 316, a frequency value associated with the variable value key in data structure $T_{xkn}$ is initialized with the read frequency value.

In operation 318, a determination is made concerning whether the read variable value is a last variable value of input dataset 124. When the read variable value is a last variable value, processing continues in operation 320. When the read variable value is not a last variable value, processing continues in operation 302 to read and process the next variable value.

In operation 320, processing to compute frequency data $T_{xkn}$ for unique values of the variable x by the thread k and the computing node n is complete or is stopped, and control returns to the calling operation. When the number of threads $N_T$ or the number of computing nodes $N_N$ is greater than one, the computed frequency data $T_{xkn}$ is returned to a controlling process and/or a controlling computing device. For example, quantile computation device 100 may be executing the controlling process and act as the controlling computing device.

Referring again to FIG. 2A, in an operation 216, a determination is made concerning whether the counter flag indicates true such that the number of unique values of the variable x exceeds the maximum number of data structure nodes N. When the counter flag indicates true, processing continues in an operation 218. When the counter flag indicates false, processing continues in an operation 234.

Figure 2B:
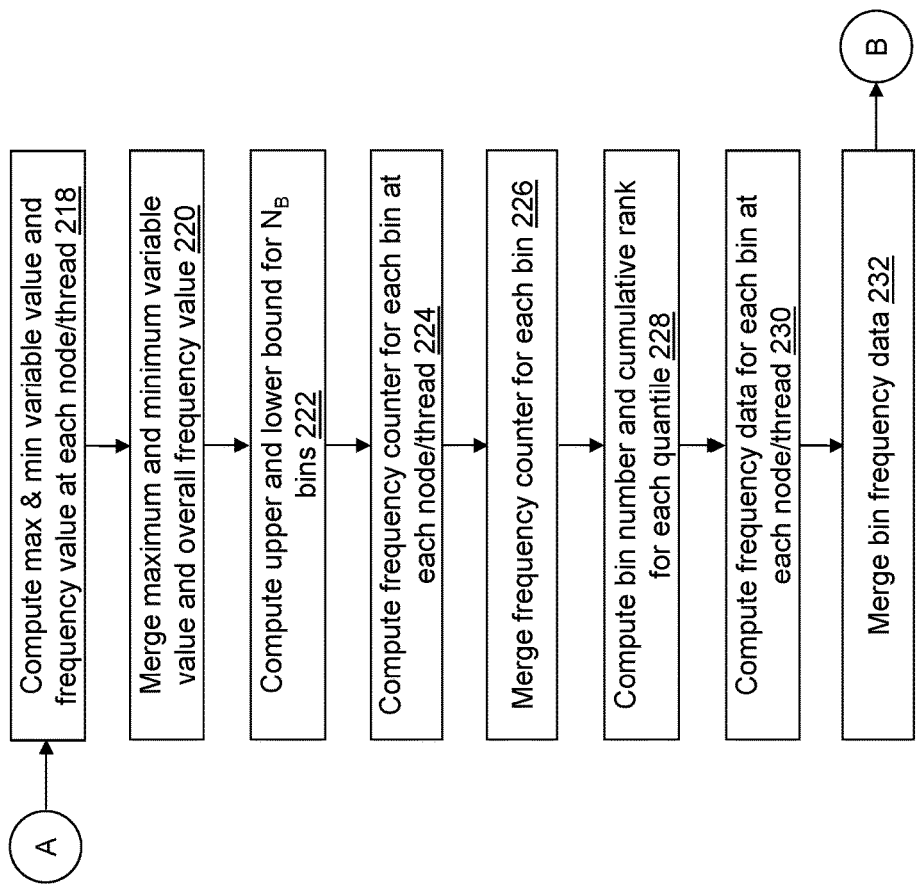
Figure 3:
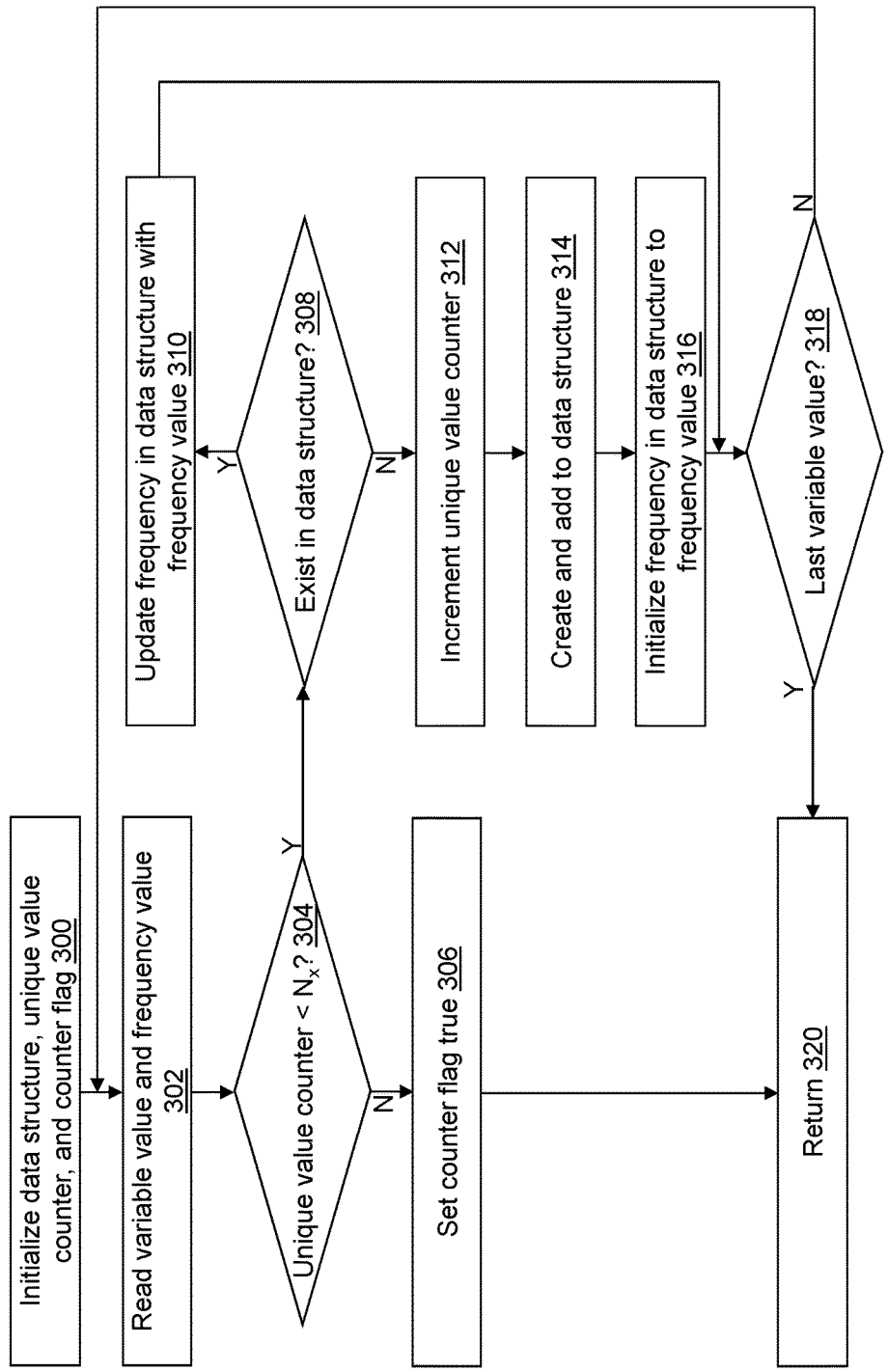
Figure 5:
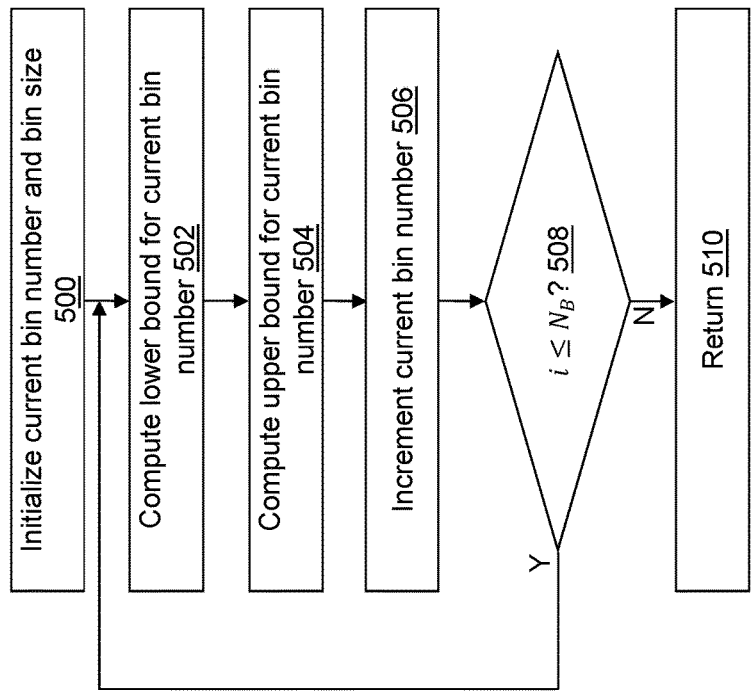
Figure 4:
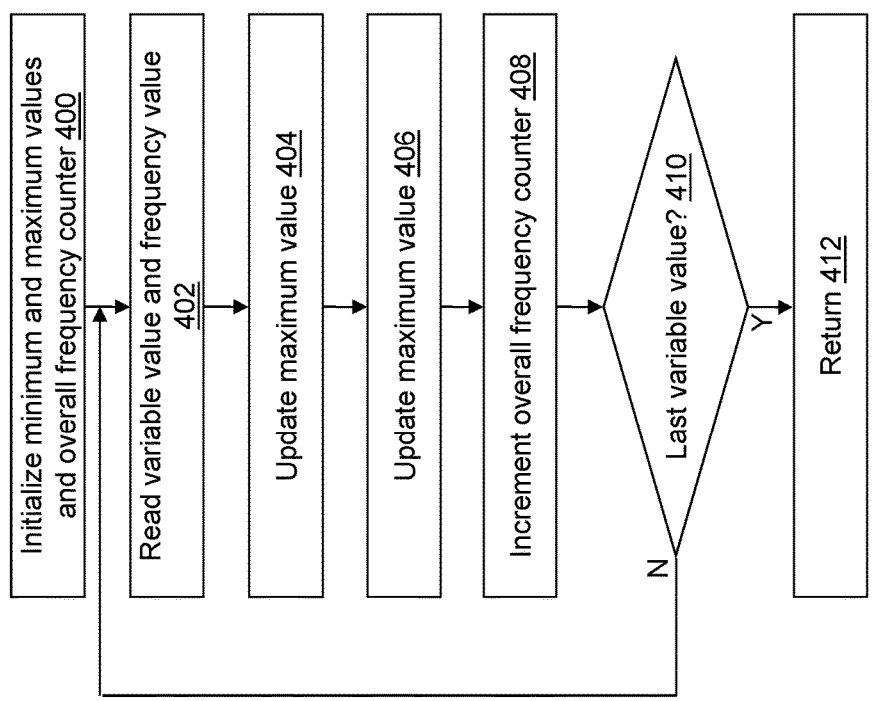
Figure 6:
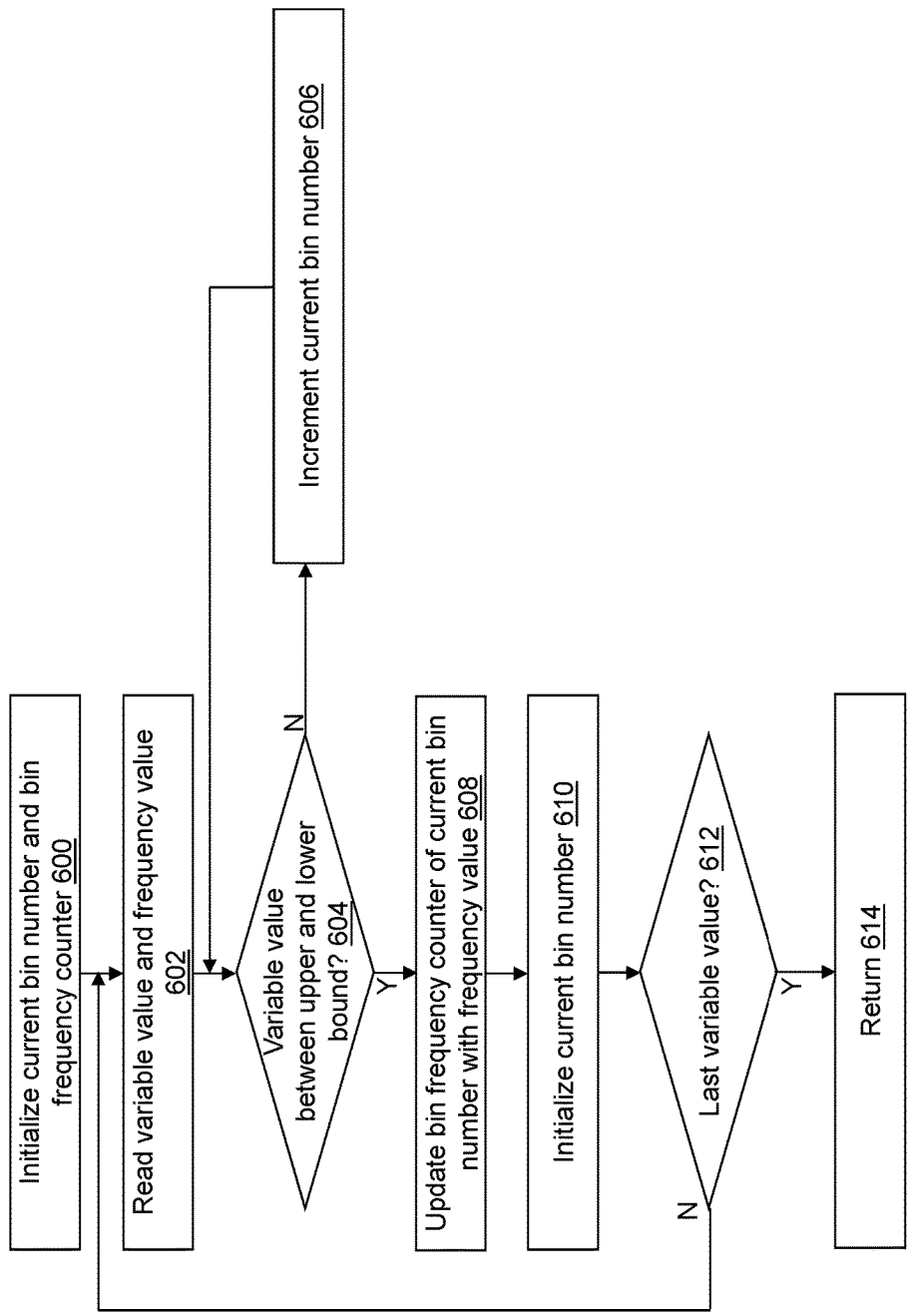
Figure 7:
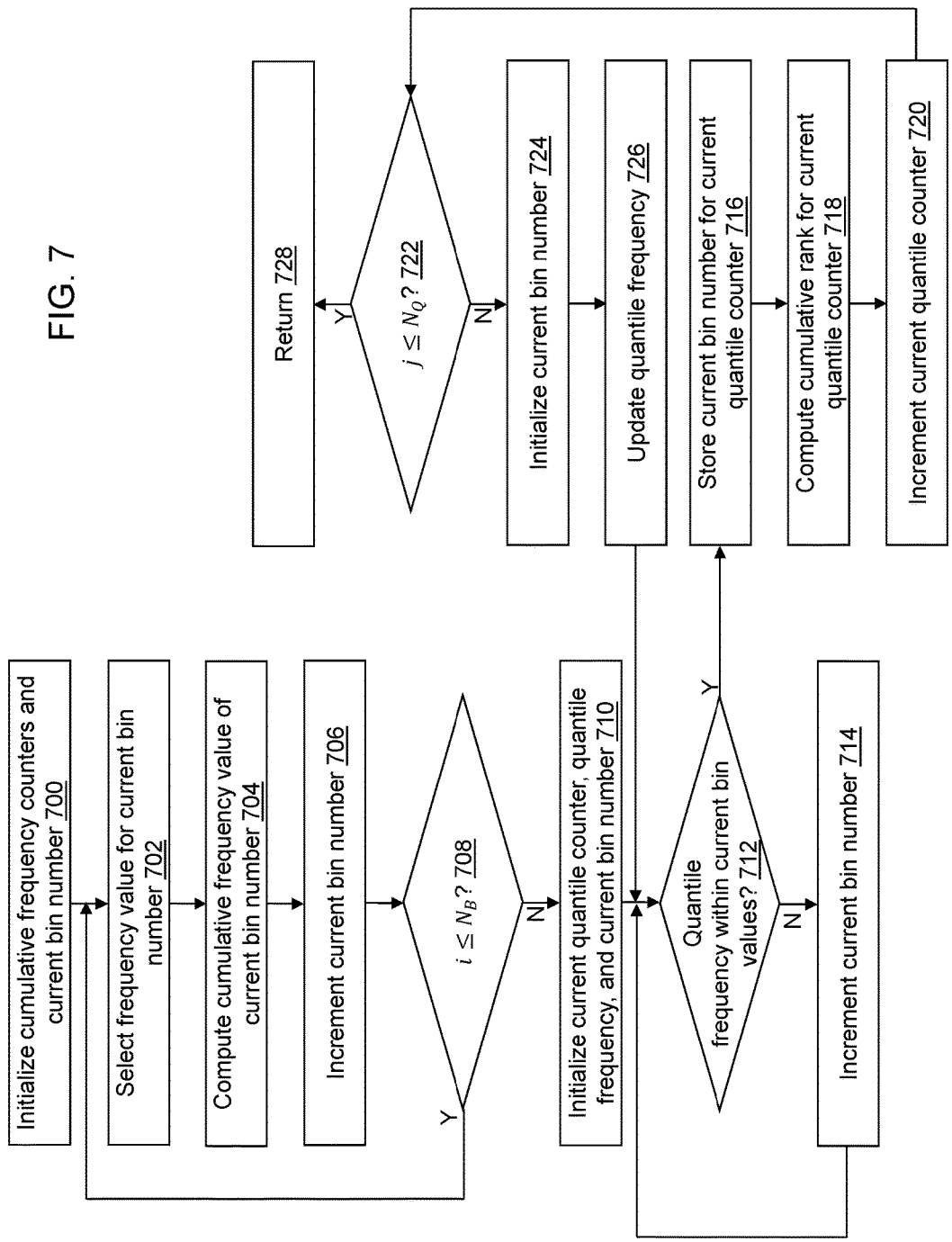
Figure 8:
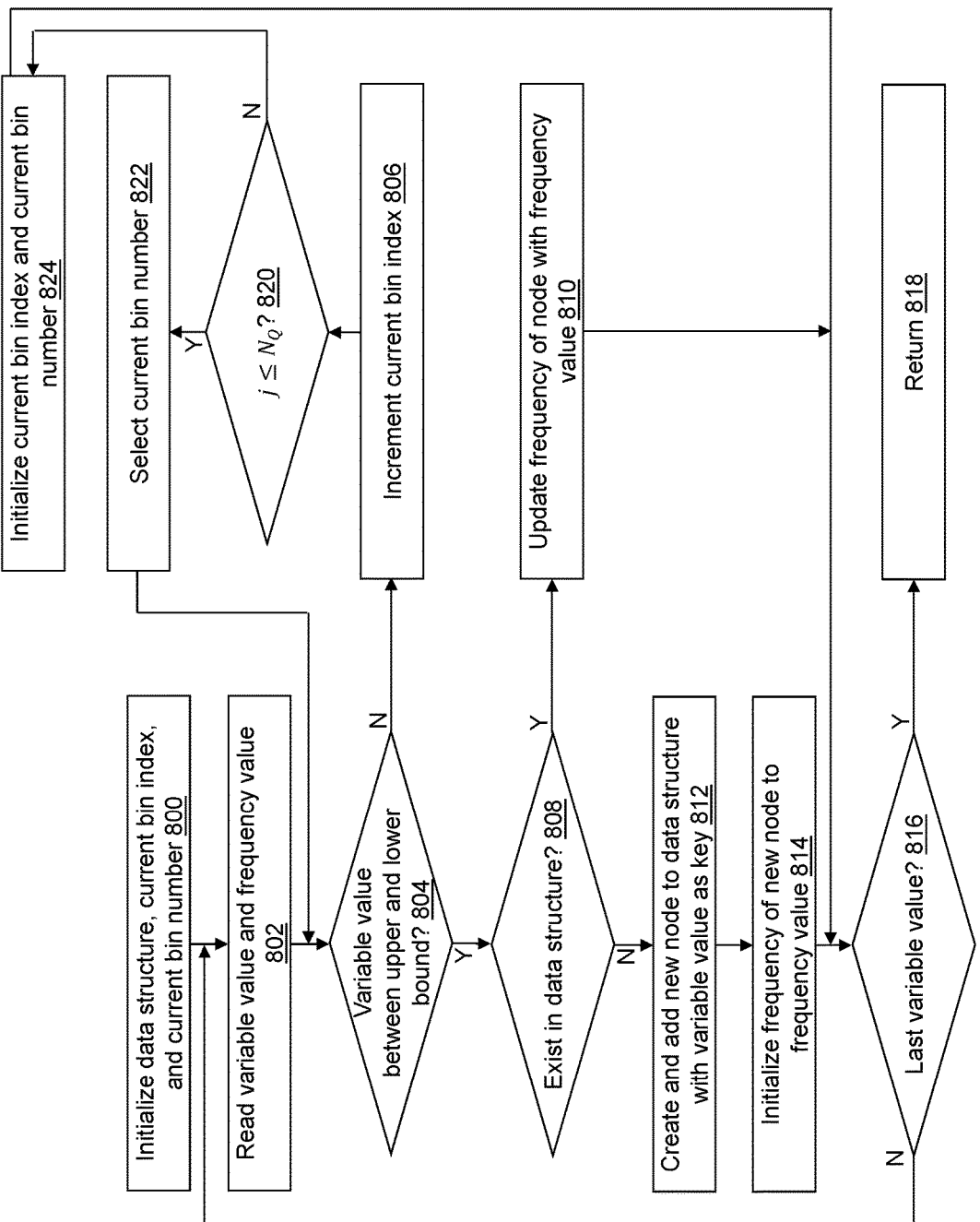

Referring to FIG. 2B, in operation 218, a maximum value $M_{xkn}$, a minimum value $M_{nkn}$, and a total number of observations $N_{okn}$ of the variable x may be computed by each thread k of the number of threads $N_T$ of each computing device n of the number of computing nodes $N_N$ of distributed computing system 128. For illustration, example operations for the maximum value $M_{xkn}$, the minimum value $M_{nkn}$, and the total number of observations $N_{okn}$ of the variable x are shown referring to FIG. 4.

In an operation 400, a maximum value $M_{xkn}$, a minimum value $M_{ikn}$, and a total number of observations $N_{okn}$ of the variable x are initialized. For example, the maximum value $M_{xkn}$ is initialized to a maximum value included in frequency data $T_{xkn}$, the minimum value $M_{ikn}$ is initialized to a minimum value included in frequency data $T_{xkn}$, and the total number of observations $N_{okn}$ is initialized based on the frequency values stored in frequency data $T_{xkn}$. Frequency data $T_{xkn}$ can then be discarded because it is incomplete.

In an operation 402, a variable value v for variable x and a frequency value for the variable value are read from input dataset 124. On a first iteration of operation 402, the line read in operation 302 that resulted in setting the counter flag to true in operation 306 may be processed instead of reading a next line from input dataset 124.

In an operation 404, the maximum value $M_{xkn}$ may be updated with the read variable value if the read variable value is greater than the maximum value $M_{xkn}$.

In an operation 406, the minimum value $M_{ikn}$ may be updated with the read variable value if the read variable value is less than the minimum value $M_{ikn}$.

In an operation 408, the total number of observations $N_{okn}$ is updated by adding the read frequency value to the total number of observations $N_{okn}$.

In an operation 410, a determination is made concerning whether the read variable value is a last variable value of input dataset 124. When the read variable value is a last variable value, processing continues in an operation 412. When the read variable value is not a last variable value, processing continues in operation 402 to read and process the next variable value.

In operation 412, processing to compute the maximum value $M_{xkn}$, the minimum value $M_{ikn}$, and the total number of observations $N_{okn}$ of the variable x is complete, and control returns to the calling operation.

Referring again to FIG. 2B, in an operation 220, the maximum value $M_{xkn}$, the minimum value $M_{ikn}$, and the total number of observations $N_{okn}$ of the variable x computed by each thread k of the number of threads $N_T$ of each computing device n of the number of computing nodes $N_N$ of distributed computing system 128 is merged to define a global maximum value $M_{xg}$, a global minimum value $M_{ig}$, and a global total number of observations $N_{og}$ of the variable x for input dataset 124.

In an operation 222, upper and lower bounds are computed for each bin of the $N_B$ bins indicated in operation 212. For illustration, example operations for computing the upper and lower bounds are shown referring to FIG. 5.

In an operation 500, a current bin number i and a bin size are initialized. For example, the current bin number is initialized to i=1, and the bin size is initialized to $S=(M_{xg}-M_{ig})/N_B$.

In an operation 502, a lower bound LB for the current bin number i is computed as $LB_i=M_{ig}+i*S$, where LB may be an array storing $N_B$ values.

In an operation 504, an upper bound UB for the current bin number i is computed as $UB_i=LB_i+S$, where UB may be an array storing $N_B$ values.

In an operation 506, the current bin number i is incremented by one.

In an operation 508, a determination is made concerning whether the current bin number i is greater than $N_B$ such that all of the $N_B$ bins have been processed. When $i \leq N_B$, processing continues in operation 502 to compute the bounds for the next bin. When $i > N_B$, processing continues in an operation 510.

In operation 510, processing to compute the upper and lower bounds for each bin of the $N_B$ bins is complete, and control returns to the calling operation.

Referring again to FIG. 2B, in operation 224, a bin frequency counter $F_{bkn}$ for each bin b of the $N_B$ bins may be computed by each thread k of the number of threads $N_T$ of each computing device n of the number of computing nodes $N_N$ of distributed computing system 128. For illustration, example operations for computing frequency counter $F_{bkn}$ are shown referring to FIG. 6.

In an operation 600, a current bin number i and each bin frequency counter $F_{bkn}$ of the $N_B$ bins are initialized. For example, the current bin number is initialized to i=1, and each bin frequency counter $F_{bkn}$ of the $N_B$ bins is initialized to zero, where $F_{bkn}$ may be an array storing $N_B$ values.

In an operation 602, a variable value v for variable x and a frequency value for the variable value are read from input dataset 124.

In an operation 604, a determination is made concerning whether the read variable value is between the upper and the lower bound of the current bin based on $LB_i \leq v < UB_i$. When the read variable value is between the upper and the lower bound, processing continues in an operation 608. When the read variable value is not between the upper and the lower bound, processing continues in an operation 606.

In operation 606, the current bin number i is incremented by one, and processing continues in operation 604 to determine if the read variable value is within the next bin.

In operation 608, the bin frequency counter $F_{ikn}$ associated with the current bin number i is updated by adding the read frequency value to the bin frequency counter $F_{ikn}$.

In an operation 610, the current bin number is reinitialized to i=1.

In an operation 612, a determination is made concerning whether the read variable value is a last variable value of input dataset 124. When the read variable value is a last variable value, processing continues in an operation 614. When the read variable value is not a last variable value, processing continues in operation 602 to read and process the next variable value.

In operation 614, processing to compute the bin frequency counter $F_{bkn}$ for each bin b of the $N_B$ bins is complete, and control returns to the calling operation.

Referring again to FIG. 2B, in an operation 226, the bin frequency counter $F_{bkn}$ for each bin b of the $N_B$ bins computed by each thread k of the number of threads $N_T$ of each computing device n of the number of computing nodes $N_N$ of distributed computing system 128 is merged to define a global frequency counter $F_{bg}$ for each bin b of the $N_B$ bins for input dataset 124. For example, the values computed by each thread k and each computing device n are added together for each bin b of the $N_B$ bins to compute global frequency counter $F_{bg}$ for each bin b of the $N_B$ bins. $F_{bg}$ may be an array storing $N_B$ values.

In an operation 228, a bin number $W_j$ and a cumulative rank value $R_j$ can be computed for each quantile, where j is a quantile index into the quantile set Q indicated in operation 204. As a result, $W_j$ and $R_j$ store $N_Q$ values. $W_j$ and $R_j$ may each be an array storing $N_Q$ values though different types of data structures may be used. For illustration, example operations for computing bin number $W_j$ and cumulative rank value $R_j$ are shown referring to FIG. 7.

In an operation 700, a current bin number i and a cumulative frequency counter $CF_b$ of the $N_B$ bins are initialized. For example, the current bin number is initialized to i=1, and each cumulative frequency counter $CF_b$ of the $N_B$ bins is initialized to zero, where $CF_b$ may be an array storing $N_B$ values. $CF_0$ may be initialized to zero. A zeroth entry of global frequency counter $F_{bg}$ may be set to zero as $F_{0g}=0$.

In an operation 702, a frequency value $F_{ig}$ is selected from the computed global frequency counter $F_{bg}$ as the value associated with the current bin number i.

In an operation 704, a cumulative frequency counter $CF_i$ for the current bin number i is computed as $CF_i=CF_{i-1}+F_{ig}$.

In an operation 706, the current bin number i is incremented by one.

In an operation 708, a determination is made concerning whether the current bin number i is greater than $N_B$ such that all of the $N_B$ bins have been processed. When $i \leq N_B$, processing continues in operation 702 to compute the cumulative frequency counter for the next bin. When $i > N_B$, processing continues in an operation 710.

In operation 710, the current bin number i, a current quantile counter j, a current quantile q, and a current quantile frequency QF are initialized. For example, the current bin number is reinitialized to i=1, the current quantile counter is initialized to j=1, the current quantile q is selected as a first entry from the quantile set Q as $q=Q_1$, and the current quantile frequency is initialized to $QF=q*N_{og}$. $N_{og}$ is a total frequency count. For illustration, if q=10% and $N_{og}=100$, QF=10 so that the tenth rank is the current quantile frequency QF.

In an operation 712, a determination is made concerning whether the current quantile frequency QF is between the cumulative frequency counters bounding the current bin based on $CF_{i-1} \leq QF < CF_i$. When the current quantile frequency QF is between the cumulative frequency counter of the current bin, processing continues in an operation 716. When the current quantile frequency QF is not between the cumulative frequency counter of the current bin, processing continues in an operation 714.

In operation 714, the current bin number i is incremented by one, and processing continues in operation 712 to determine if the current quantile frequency QF is within the cumulative frequency counters bounding the next bin.

In operation 716, the current bin number i is stored in bin number array $W_j=i$ in association with the current quantile counter j. For example, j is used as an index into $W_j$ stored as an array.

In an operation 718, a cumulative rank value r for the current quantile counter j is computed using $r=(QF-CF_{i-1})+F_{(i-1)g}$, and stored in cumulative rank value array $R_j=r$ in association with the current quantile counter j. For example, j is used as an index into $R_j$ stored as an array.

In an operation 720, the current quantile counter j is incremented by one.

In an operation 722, a determination is made concerning whether the current quantile counter j is greater than $N_Q$ such that all of the $N_Q$ quantiles of the quantile set Q have been processed. When $j \leq N_Q$, processing continues in an operation 724. When $j > N_Q$, processing continues in an operation 728.

In operation 724, the current bin number is reinitialized to i=1.

In an operation 726, the current quantile q is selected as a $j^{th}$ entry from the quantile set Q as $q=Q_j$, the current quantile frequency is updated to $QF=q*N_{og}$, and processing continues in operation 712 to identify the bin within which the current quantile frequency is located.

In operation 728, processing to compute the bin number $W_j$ and the cumulative rank value $R_j$ for each quantile j of the $N_Q$ quantiles of the quantile set Q is complete, and control returns to the calling operation.

Referring again to FIG. 2B, in an operation 230, frequency data $T_{bkn}$ for each number of x values in the bin defined for each quantile q may be computed by each thread k of the number of threads $N_T$ of each computing device n of the number of computing nodes $N_N$ of distributed computing system 128. Frequency data $T_{bkn}$ may be computed in a variety of manners. For illustration, example operations for computing frequency data $T_{bkn}$ are shown referring to FIG. 8.

In an operation 800, a data structure $T_{bkn}$ for the frequency data, a current bin index j, and a current bin number i are initialized. For example, a current bin index is initialized to j=1 and is used to index into the bin number $W_j$. For example, for an array type data structure for frequency data, memory is allocated for the array and array values are initialized to zero; for an AVL tree type data structure for frequency data, an empty tree is initialized; etc. The current bin number i is selected as a first entry from bin number $W_j$ as $i=W_1$.

In an operation 802, a variable value v for variable x and a frequency value for the variable value are read from input dataset 124.

In an operation 804, a determination is made concerning whether the read variable value is between the upper bound and the lower bound of the current bin number selected from bin number $W_j$ based on $LB_i \leq v < UB_i$. When the read variable value is between the upper and the lower bounds, processing continues in an operation 808. When the read variable value is not between the upper and the lower bounds, processing continues in an operation 806.

In operation 806, the current bin index j is incremented by one, and processing continues in an operation 820.

In operation 808, a determination is made concerning whether the variable value exists in data structure $T_{bkn}$. When the variable value exists in data structure $T_{bkn}$, processing continues in an operation 810. When the variable value does not exist in data structure $T_{xkn}$, processing continues in an operation 812. For example, the read variable value is compared to existing keys of data structure $T_{bkn}$ to identify a matching key if it exists.

In operation 810, a frequency value associated with the existing variable value is updated in data structure $T_{bkn}$ by adding the read frequency value to the frequency value associated with the existing variable value, and processing continues in an operation 816.

In operation 812, a new entry is created and added to data structure $T_{bkn}$. For example, a new AVL tree node is added in ascending order to data structure $T_{bkn}$ using the read variable value as a key so that the variable values are maintained in sorted order in data structure $T_{bkn}$.

In an operation 814, a frequency associated with the variable value key in data structure $T_{bkn}$ is initialized with the read frequency value.

In operation 816, a determination is made concerning whether the read variable value is a last variable value of input dataset 124. When the read variable value is a last variable value, processing continues in an operation 818. When the read variable value is not a last variable value, processing continues in operation 802 to read and process the next variable value.

In operation 818, processing to compute the frequency data $T_{bkn}$ for each bin k of the bin number array $W_k$, is complete, and control returns to the calling operation.

In operation 820, a determination is made concerning whether the current bin index j is greater than $N_Q$ such that each bin j of the bin number array $W_j$ has been processed. When $j \leq N_Q$, processing continues in an operation 822. When $j > N_Q$, processing continues in an operation 824.

In an operation 822, the current bin number i is selected as the $j^{th}$ entry from the bin number as $i=W_j$, and processing continues in operation 804 to determine if the read variable value is within the next bin of bin number $W_j$.

In operation 824, the current bin index is reinitialized to j=1, and the current bin number i is selected as a first entry from bin number $W_j$ as $i=W_j$, and processing continues in operation 816 to process the next variable value if any.

Referring again to FIG. 2B, in operation 232, frequency data $T_{bkn}$ computed by each thread of the number of threads $N_T$ of each computing device of the number of computing nodes $N_N$ of distributed computing system 128 is merged to define frequency data $T_{bg}$ on quantile computation device 100 that stores global frequency data for input dataset 124. Processing continues in an operation 238.

Referring again to FIG. 2A, in operation 234, frequency data $T_{xkn}$ computed by each thread of the number of threads $N_T$ of each computing device of the number of computing nodes $N_N$ of distributed computing system 128 is merged to define frequency data $T_{xg}$ on quantile computation device 100 that stores global frequency data for input dataset 124. The global total number of observations $N_{og}$ of the variable x is also computed.

In an operation 236, a cumulative rank value $R_j$ for each quantile j of the $N_Q$ quantiles of the quantile set Q indicated in operation 204 is computed. For illustration, the quantiles and the computed cumulative rank value may be stored as arrays with values accessed using the same index. A rank indicates a numerical order of a respective value of the variable x. The cumulative rank value $R_j$ can be computed for each $j^{th}$ quantile using $R_j=Q_j/N_{og}$, where the $j^{th}$ quantile $Q_j$ is selected as a $j^{th}$ entry from the quantile set Q.

In an operation 238, a quantile value is computed for each quantile of the $N_Q$ quantiles of the quantile set Q indicated in operation 204 using the computed frequency data. The quantile value is the value of the variable x associated with the quantile. When performed after operation 234, the frequency data is $T_{xg}$ that includes values for each unique value of the variable x; whereas, when performed after operation 232, the frequency data is $T_{bg}$ that includes values for each number of x values in the bin defined for each quantile q. As a result, frequency data $T_{bg}$ is much smaller in size than frequency data $T_{xg}$ when $N_U \geq N_x$ and is much faster to process to compute the quantile value for each quantile.

Figure 9:
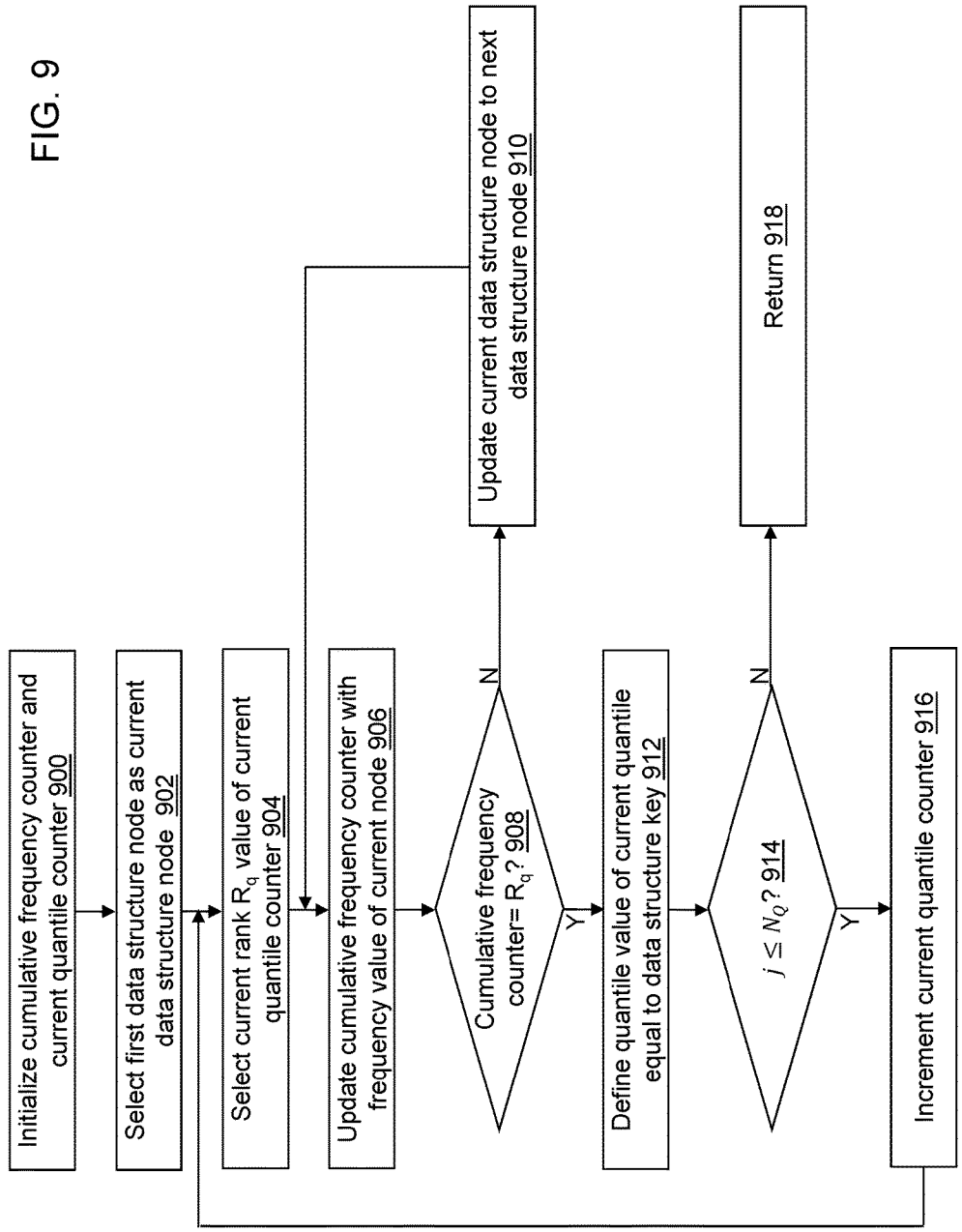

For illustration, example operations for computing each quantile value from the frequency data $T_{xg}$ or $T_{bg}$ and from the cumulative rank value $R_j$ for each quantile of the $N_Q$ quantiles of the quantile set Q are shown referring to FIG. 9.

In an operation 900, a current quantile counter j, and a cumulative frequency counter C are initialized. For example, the current quantile counter is initialized to j=1, and the cumulative frequency counter is initialized to C=0.

In an operation 902, a first data structure node is selected from either the frequency data $T_{xg}$ or $T_{bg}$ as a current data structure node. For example, for an array type data structure for frequency data, a first node is an index equal to one; for an AVL tree type data structure for frequency data, a first node pointer is retrieved from the tree; etc.

In an operation 904, a current rank valuer is selected from the cumulative rank value $R_j$ using the current quantile counter j as $r=R_j$.

In an operation 906, the cumulative frequency counter C is updated by adding the frequency value stored in association with the current data structure node to the current value of the cumulative frequency counter C+=FV, where FV is the frequency value stored in association with the current data structure node.

In an operation 908, a determination is made concerning whether the cumulative frequency counter C is equal to the current rank value r based on C=r. When C=r, processing continues in an operation 912. When C # r, processing continues in an operation 910.

In operation 910, the current data structure node is updated to a next data structure node, and processing continues in operation 906. For example, for an array type data structure for frequency data, a next node is determined by incrementing the index; for an AVL tree type data structure for frequency data, a next node pointer is retrieved from the tree; etc.

In operation 912, a quantile value $Z_j$ for the current quantile counter j is selected as the key value associated with the current data structure node. As a result, $Z_j$ stores $N_Q$ values. $Z_j$ may be an array storing $N_Q$ values though different types of data structures may be used.

In an operation 914, a determination is made concerning whether the current quantile counter j is greater than $N_Q$ such that all of the $N_Q$ quantiles of the quantile set Q have been processed. When $j \leq N_Q$, processing continues in an operation 916. When $j > N_Q$, processing continues in an operation 918.

In operation 916, the current quantile counter j is incremented by one, and processing continues in operation 904.

In operation 918, processing to compute each quantile value $Z_j$ for each quantile of the $N_Q$ quantiles of the quantile set Q is complete, and control returns to the calling operation.

Referring again to FIG. 2A, in an operation 240, the quantile value(s) $Z_j$ computed for each quantile of the $N_Q$ quantiles of the quantile set Q indicated in operation 204 may be output to quantile values 126 stored on computer-readable medium 108 or another computer-readable medium of distributed computing system 128. The associated quantile of the $N_Q$ quantiles of the quantile set Q may also be output. In addition, or in the alternative, quantile values 126 may be presented on display 116, for example, graphically in a histogram or a table, printed on printer 120, sent to another computing device using communication interface 106, etc. In addition, or in the alternative, quantile values 126 may be returned to a calling function that requested computation of the one or more quantiles of the quantile set Q that may be executing on quantile computation device 100 or another computing device of distributed computing system 128. Processing by quantile computation application 122 is either done or process control returns to the calling function.

For comparison, quantile computation application 122 was compared to two existing actions implemented in SAS Viya 3.2: 1) a "percentile" action that implements an iterative algorithm as described in United States Patent Publication Number 20130325825 assigned to the assignee of the present application, and 2) an "aggregate" action that implements a sorting-based algorithm.

To test the performance, input dataset 124 with 1 million, 10 million, and 20 million rows was generated and the three methods were executed using a symmetric multi-processing mode on quantile computation device 100 as a single computing device with $N_X=N_B=10000$ and $N_N=1$. Quantile computation device 100 included eight core processors, a 2699 megahertz processor speed, and 252 gigabytes of RAM. Input dataset 124 included variable values computed using a uniform distribution with a minimum value of zero and a maximum value of 100. Table I shows run time comparisons between each of the three methods with different dataset sizes and number of threads.

TABLE I

| | | Run Time (seconds) | | |
|---|---|---|---|---|
| Input dataset 124 | $N_T$ | Quantile computation application 122 | Percentile Action, SAS Viya 3.2 | Aggregate Action, SAS Viya 3.2 |
| 1 million rows | 1 | 0.55 | 0.79 | 3.71 |
| | 5 | 0.22 | 0.18 | 2.51 |
| | 10 | 0.13 | 0.11 | 1.98 |
| | 15 | 0.13 | 0.15 | 2.06 |
| | 20 | 0.10 | 0.12 | 2.22 |
| | 25 | 0.09 | 0.12 | 2.39 |
| | 30 | 0.08 | 0.12 | 2.43 |

TABLE I-continued

| Input dataset 124 | $N_T$ | Run Time (seconds) | | |
|---|---|---|---|---|
| | | Quantile computation application 122 | Percentile Action, SAS Viya 3.2 | Aggregate Action, SAS Viya 3.2 |
| 10 million rows | 1 | 5.45 | 8.34 | 55.98 |
| | 5 | 1.89 | 1.71 | 31.18 |
| | 10 | 1.69 | 0.98 | 21.71 |
| | 15 | 1.50 | 0.66 | 33.74 |
| | 20 | 1.00 | 0.61 | 33.35 |
| | 25 | 1.01 | 0.66 | 34.41 |
| | 30 | 0.77 | 0.77 | 28.69 |
| 20 million rows | 1 | 10.93 | 15.42 | 90.90 |
| | 5 | 4.47 | 3.41 | 71.10 |
| | 10 | 3.12 | 1.80 | 52.14 |
| | 15 | 1.42 | 1.31 | 55.69 |
| | 20 | 2.40 | 1.20 | 56.61 |
| | 25 | 1.23 | 0.95 | 71.60 |
| | 30 | 1.47 | 0.95 | 73.30 |

Another input dataset 124 was also generated with variable values computed using a normal distribution with a mean value of zero and a standard deviation value of 100. Table II shows run time comparisons between each of the three methods with different dataset sizes and number of threads.

TABLE II

| Input dataset 124 | $N_T$ | Run Time (seconds) | | |
|---|---|---|---|---|
| | | Quantile computation application 122 | Percentile Action, SAS Viya 3.2 | Aggregate Action, SAS Viya 3.2 |
| 1 million rows | 1 | 0.56 | 1.01 | 3.46 |
| | 5 | 0.20 | 0.21 | 3.30 |
| | 10 | 0.17 | 0.11 | 3.17 |
| | 15 | 0.12 | 0.08 | 3.20 |
| | 20 | 0.12 | 0.07 | 3.28 |
| | 25 | 0.10 | 0.07 | 3.43 |
| | 30 | 0.08 | 0.09 | 3.52 |
| 10 million rows | 1 | 5.64 | 11.62 | 40.08 |
| | 5 | 2.01 | 2.35 | 33.09 |
| | 10 | 1.70 | 1.23 | 32.63 |
| | 15 | 1.46 | 0.86 | 35.67 |
| | 20 | 1.25 | 0.69 | 35.29 |
| | 25 | 0.93 | 0.60 | 34.98 |
| | 30 | 0.77 | 0.67 | 36.76 |
| 20 million rows | 1 | 11.27 | 20.24 | 89.29 |
| | 5 | 4.14 | 4.08 | 67.90 |
| | 10 | 3.42 | 2.05 | 67.88 |
| | 15 | 3.02 | 1.53 | 68.97 |
| | 20 | 2.55 | 1.18 | 67.85 |
| | 25 | 1.99 | 1.03 | 70.74 |
| | 30 | 1.36 | 1.00 | 75.21 |

Quantile computation application 122 achieves significantly faster computations times in comparison to the aggregate action provided by SAS Viya 3.2, which both provide an exact result without the need to specify stopping criteria such as the maximal number of iterations and convergence tolerance.

Though the percentile action provided by SAS Viya 3.2 sometimes provided faster results than quantile computation application 122, the percentile action does not guarantee an exact solution and requires specification of stopping criteria such as a maximum number of iterations and a convergence tolerance. For example, Table III shows two examples of a convergence status generated using the percentile action with different settings for the maximum number of iterations (Maxiters) and the convergence tolerance (Tolerance) used to stop execution of the iterative algorithm. The first dataset "Arrest prediction" used a neural network prediction of arrest using a Chicago arrest dataset, and the second dataset "Age group prediction" used a logistics regression prediction of age group using a dataset named CAMPNRML.

TABLE III

| Dataset | Variable | Maxiters | Tolerance | Converge (Y/N) |
|---|---|---|---|---|
| Arrest prediction | P_arrest | 10 | 1.00E−05 | N |
| | | 20 | 1.00E−05 | N |
| | | 30 | 1.00E−05 | N |
| | | 40 | 1.00E−05 | N |
| | | 50 | 1.00E−05 | Y |
| | | 10 | 1.00E−06 | N |
| | | 20 | 1.00E−06 | N |
| | | 30 | 1.00E−06 | N |
| | | 40 | 1.00E−06 | N |
| | | 50 | 1.00E−06 | Y |
| Age group prediction | P_va_d_Age_Group_21 | 10 | 1.00E−05 | N |
| | | 20 | 1.00E−05 | N |
| | | 30 | 1.00E−05 | N |
| | | 40 | 1.00E−05 | N |
| | | 50 | 1.00E−05 | N |
| | | 60 | 1.00E−05 | N |
| | | 70 | 1.00E−05 | Y |
| | | 10 | 1.00E−06 | N |
| | | 20 | 1.00E−06 | N |
| | | 30 | 1.00E−06 | N |
| | | 40 | 1.00E−06 | N |
| | | 50 | 1.00E−06 | N |
| | | 60 | 1.00E−06 | N |
| | | 70 | 1.00E−06 | Y |

As shown in Table III, the percentile action cannot converge in many cases before hitting the stop criterion. For convergence, the user must specify appropriate values for the maximum number of iterations (Maxiters) and the convergence tolerance (Tolerance) using trial and error, which requires additional computing time and user analysis time that is not captured in Tables I and II.

Quantile computation application 122 provides an efficient and exact method to locate quantiles in at most three passes through input dataset 124 that may be distributed or classified as "big data" due to the large number of values of the variable. Quantile computation application 122 avoids non-convergence situations that may occur using the iterative algorithm (the percentile action) and does not need expensive sorting that may occur using the sorting-based algorithm (the aggregate action). Therefore, quantile computation application 122 is an improvement to existing processes performed by computing devices in solving the technical problem of computing quantiles from a dataset. Quantile computation application 122 does not require a stopping criterion such as a number of iterations or a convergence tolerance for which values may be difficult to define. Quantile computation application 122 also computes an exact quantile for any distributed or big data with comparable or significantly less computational cost compared with existing methods.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A system configurable for a distributed data environment to provide a quantile value summary of the distributed data, the system comprising:
a communication interface to send control instructions and to receive data from a plurality of computing devices on which distributed data is stored;
a processor communicatively coupled to the communication interface for processing the data, the processed data comprising a plurality of records and variables that describe a characteristic of a physical object;
a non-transitory computer-readable medium having stored thereon computer-readable instructions that cause the processor to coordinate execution of a quantile computation application comprising
computing a maximum value and a minimum value for a plurality of unsorted variable values of a variable read from the distributed data;
computing an upper bin value and a lower bin value for each bin of a plurality of bins using the computed maximum value and the computed minimum value;
computing a frequency counter for each bin of the plurality of bins by reading the plurality of unsorted variable values of the variable from the distributed data a second time, wherein each frequency counter is a count of the variable values within a respective bin based on a variable value between the computed upper bin value and the computed lower bin value of the respective bin;
computing a bin number and a cumulative rank value for a quantile using the frequency counter for each bin of the plurality of bins, wherein the bin number identifies a specific bin of the plurality of bins within which a quantile value associated with the quantile is located, wherein the cumulative rank value identifies a cumulative rank for the quantile value associated with the quantile;
computing frequency data for each unique value of the variable values read from the distributed data that is between the computed upper bin value and the computed lower bin value of the computed bin number by reading the plurality of unsorted variable values of the variable from the distributed data a third time, wherein the frequency data includes the variable value and a number of occurrences of the variable value for each unique value; and
computing the quantile value associated with the quantile using the computed frequency data and the computed cumulative rank value for the quantile; and
an output interface communicatively coupled to the processor to provide the computed quantile value to be visually presented in one or more data graphs on a display device.

2. A non-transitory computer-readable medium having stored thereon computer-readable instructions that when executed by a computing device cause the computing device to:
(a) compute a maximum value and a minimum value for a plurality of unsorted variable values of a variable read from a dataset;
(b) compute an upper bin value and a lower bin value for each bin of a plurality of bins using the computed maximum value and the computed minimum value;
(c) compute a frequency counter for each bin of the plurality of bins by reading the plurality of unsorted variable values of the variable from the dataset a second time, wherein each frequency counter is a count of the variable values within a respective bin based on a variable value between the computed upper bin value and the computed lower bin value of the respective bin;
(d) compute a bin number and a cumulative rank value for a quantile using the frequency counter for each bin of the plurality of bins, wherein the bin number identifies a specific bin of the plurality of bins within which a quantile value associated with the quantile is located, wherein the cumulative rank value identifies a cumulative rank for the quantile value associated with the quantile;
(e) compute frequency data for each unique value of the variable values read from the dataset that is between the computed upper bin value and the computed lower bin value of the computed bin number by reading the plurality of unsorted variable values of the variable from the dataset a third time, wherein the frequency data includes the variable value and a number of occurrences of the variable value for each unique value;
(f) compute the quantile value associated with the quantile using the computed frequency data and the computed cumulative rank value for the quantile; and
(g) output the computed quantile value.

3. The non-transitory computer-readable medium of claim 2, wherein (d) to (g) are performed for a plurality of quantiles, wherein the quantile is one of the plurality of quantiles.

4. The non-transitory computer-readable medium of claim 2, wherein (a) to (g) are performed for a plurality of variables, wherein the variable value is associated with one variable of the plurality of variables.

5. The non-transitory computer-readable medium of claim 2, wherein the dataset is distributed among a plurality of threads of the computing device, wherein (a) is performed by each thread of the plurality of threads, wherein after (a) and before (b), the computer-readable instructions further cause the computing device to compute an overall maximum value and an overall minimum value from the maximum value and the minimum value computed by each thread, wherein computing the upper bin value and the lower bin value for each bin of the plurality of bins uses the computed overall maximum value and the computed overall minimum value.

6. The non-transitory computer-readable medium of claim 5, wherein (c) is performed by each thread of the plurality of threads, wherein after (c) and before (d), the computer-readable instructions further cause the computing device to compute an overall frequency counter for each bin of the plurality of bins from the frequency counter for each bin of the plurality of bins computed by each thread, wherein computing the bin number and the cumulative rank value for the quantile uses the overall frequency counter for each bin of the plurality of bins.

7. The non-transitory computer-readable medium of claim 6, wherein (e) is performed by each thread of the plurality of threads, wherein after (e) and before (f), the computer-readable instructions further cause the computing device to compute overall frequency data for each unique value of the variable values from the frequency data for each unique value of the variable values computed by each thread, wherein computing the quantile value associated with the quantile uses the computed overall frequency data.

8. The non-transitory computer-readable medium of claim 2, wherein the dataset is distributed among a plurality of threads of a plurality of computing devices, wherein (a) is performed by each thread of the plurality of threads of each computing device of the plurality of computing devices, wherein after (a) and before (b), the computer-readable instructions further cause the computing device to compute an overall maximum value and an overall minimum value from the maximum value and the minimum value computed by each thread of the plurality of threads of each computing device of the plurality of computing devices, wherein the computing device is one of the plurality of computing devices, wherein computing the upper bin value and the lower bin value for each bin of the plurality of bins uses the computed overall maximum value and the computed overall minimum value.

9. The non-transitory computer-readable medium of claim 8, wherein (c) is performed by each thread of the plurality of threads of each computing device of the plurality of computing devices, wherein after (c) and before (d), the computer-readable instructions further cause the computing device to compute an overall frequency counter for each bin of the plurality of bins from the frequency counter for each bin of the plurality of bins computed by each thread of the plurality of threads of each computing device of the plurality of computing devices, wherein computing the bin number and the cumulative rank value for the quantile uses the overall frequency counter for each bin of the plurality of bins.

10. The non-transitory computer-readable medium of claim 9, wherein (e) is performed by each thread of the plurality of threads of each computing device of the plurality of computing devices, wherein after (e) and before (f), the computer-readable instructions further cause the computing device to compute overall frequency data for each unique value of the variable values from the frequency data for each unique value of the variable values computed by each thread of the plurality of threads of each computing device of the plurality of computing devices, wherein computing the quantile value associated with the quantile uses the computed overall frequency data.

11. The non-transitory computer-readable medium of claim 2, wherein the dataset is distributed among a plurality of threads of a plurality of computing devices, wherein (a) is performed by each thread of the plurality of threads of each computing device of the plurality of computing devices, wherein after (a) and before (b), the computer-readable instructions further cause the computing device to compute an overall maximum value and an overall minimum value from the maximum value and the minimum value computed by each thread of the plurality of threads of each computing device of the plurality of computing devices, wherein the computing device is not one of the plurality of computing devices, wherein computing the upper bin value and the lower bin value for each bin of the plurality of bins uses the computed overall maximum value and the computed overall minimum value.

12. The non-transitory computer-readable medium of claim 2, wherein before (a), the computer-readable instructions further cause the computing device to compute first frequency data for each unique value of the variable values read from the dataset unless a number of the unique values exceeds a predefined maximum number.

13. The non-transitory computer-readable medium of claim 12, wherein, when the number of the unique values exceeds the predefined maximum number, (a) to (g) are performed.

14. The non-transitory computer-readable medium of claim 13, wherein, when the number of the unique values does not exceed the predefined maximum number, the computer-readable instructions further cause the computing device to:
compute a second cumulative rank value using $r=q/N_o$, where r is the second cumulative rank value, q is the quantile, and $N_o$ is the number of the variable values read from the dataset; and
compute the quantile value associated with the quantile using the computed first frequency data and the computed second cumulative rank value for the quantile instead of performing (a) to (f).

15. The non-transitory computer-readable medium of claim 2, wherein computing the frequency counter comprises:
initializing a current bin number to one and a bin frequency counter to zero;
(h) reading the variable value and a frequency counter value from the dataset;
(i) comparing the read variable value to the computed upper bin value and the computed lower bin value of the current bin number;
(j) when the variable value is not between the computed upper bin value and the computed lower bin value of the current bin number, incrementing the current bin number and repeating (i) to (j);
(k) when the variable value is between the computed upper bin value and the computed lower bin value of the current bin number, updating the bin frequency counter of the current bin number using the read frequency counter value, and reinitializing the current bin number to one; and
repeating (h) to (k) until each variable value is read from the dataset.

16. The non-transitory computer-readable medium of claim 15, wherein computing the bin number and the cumulative rank value for the quantile comprises:
reinitializing the current bin number to one and a cumulative frequency counter for each bin of the plurality of bins to zero;
(l) selecting the bin frequency counter of the current bin number;
(m) computing the cumulative frequency counter of the current bin number by adding the selected bin frequency counter to the cumulative frequency counter of a previous bin relative to the current bin number;
(n) incrementing the current bin number;
repeating (l) to (n) until each bin of the plurality of bins is processed;
reinitializing the current bin number to one;
initializing a quantile frequency value QF to $QF=q*N_{og}$, where q is the quantile value, and $N_{og}$ is the cumulative frequency counter of a last bin of the plurality of bins;
(o) comparing the quantile frequency value QF to the computed cumulative frequency counter of the previous bin relative to the current bin number and the computed cumulative frequency counter of the current bin number;

(p) when the quantile frequency QF is not between the computed cumulative frequency counter of the previous bin relative to the current bin number and the computed cumulative frequency counter of the current bin number, incrementing the current bin number and repeating (o) to (p); and when the quantile frequency QF is between the computed cumulative frequency counter of the previous bin relative to the current bin number and the computed cumulative frequency counter of the current bin number, storing the current bin number as the bin number for the quantile, and computing the cumulative rank value for the quantile.

17. The non-transitory computer-readable medium of claim 16, wherein the cumulative rank value for the quantile is computed using $r=(QF-CF_{i-1})+F_{(i-1)}$, where r is the cumulative rank value for the quantile, $CF_{i-1}$ is the computed cumulative frequency counter of the previous bin relative to the current bin number, and $F_{(i-1)}$ is the bin frequency counter of the previous bin relative to the current bin number.

18. The non-transitory computer-readable medium of claim 16, wherein computing the frequency data for each unique value of the variable values comprises:
(q) reading the variable value and the frequency counter value from the dataset;
(r) comparing the read variable value to the computed upper bin value and the computed lower bin value of the bin number for the quantile;
(s) when the variable value is between the computed upper bin value and the computed lower bin value of the bin number for the quantile,
determining if the read variable value exists in the frequency data;
when the read variable value exists in the frequency data, updating a frequency counter of an existing node of the frequency data associated with the read variable value using the read frequency counter value; and
when the read variable value does not exist in the frequency data, creating and adding a new node to the frequency data with the read variable value as a key and initializing the frequency counter of the new node using the read frequency counter value; and
repeating (q) to (s) until each variable value is read from the dataset.

19. The non-transitory computer-readable medium of claim 18, wherein computing the quantile value associated with the quantile comprises:
initializing a cumulative frequency counter C=0;
selecting a node of the frequency data, wherein the node is associated with a minimum value of the read variable values;
(t) updating the cumulative frequency counter C using C=C+FV, where FV is the frequency counter stored in association with the selected node;
(u) comparing the cumulative frequency counter C to the computed cumulative rank value for the quantile;
(v) when the cumulative frequency counter C is not equal to the computed cumulative rank value for the quantile, selecting a next node of the frequency data and repeating (t) to (v) with the selected next node as the selected node; and when the cumulative frequency counter C is equal to the computed cumulative rank value for the quantile, defining the quantile value equal to the key stored in association with the selected node.

20. A method of computing a quantile value, the method comprising:
(a) computing, by a computing device, a maximum value and a minimum value for a plurality of unsorted variable values of a variable read from a dataset;
(b) computing, by the computing device, an upper bin value and a lower bin value for each bin of a plurality of bins using the computed maximum value and the computed minimum value;
(c) computing, by the computing device, a frequency counter for each bin of the plurality of bins by reading the plurality of unsorted variable values of the variable from the dataset a second time, wherein each frequency counter is a count of the variable values within a respective bin based on a variable value between the computed upper bin value and the computed lower bin value of the respective bin;
(d) computing, by the computing device, a bin number and a cumulative rank value for a quantile using the frequency counter for each bin of the plurality of bins, wherein the bin number identifies a specific bin of the plurality of bins within which a quantile value associated with the quantile is located, wherein the cumulative rank value identifies a cumulative rank for the quantile value associated with the quantile;
(e) computing, by the computing device, frequency data for each unique value of the variable values read from the dataset that is between the computed upper bin value and the computed lower bin value of the computed bin number by reading the plurality of unsorted variable values of the variable from the dataset a third time, wherein the frequency data includes the variable value and a number of occurrences of the variable value for each unique value;
(f) computing, by the computing device, the quantile value associated with the quantile using the computed frequency data and the computed cumulative rank value for the quantile; and
(g) outputting, by the computing device, the computed quantile value.

21. The method of claim 20, wherein (d) to (g) are performed for a plurality of quantiles, wherein the quantile is one of the plurality of quantiles.

22. The method of claim 20, wherein (a) to (g) are performed for a plurality of variables, wherein the variable value is associated with one variable of the plurality of variables.

23. The method of claim 20, wherein the dataset is distributed among a plurality of threads of the computing device, wherein (a) is performed by each thread of the plurality of threads, wherein after (a) and before (b), further comprising computing an overall maximum value and an overall minimum value from the maximum value and the minimum value computed by each thread, wherein computing the upper bin value and the lower bin value for each bin of the plurality of bins uses the computed overall maximum value and the computed overall minimum value.

24. The method of claim 23, wherein (c) is performed by each thread of the plurality of threads, wherein after (c) and before (d), further comprising computing an overall frequency counter for each bin of the plurality of bins from the frequency counter for each bin of the plurality of bins computed by each thread, wherein computing the upper bin value and the lower bin value for each bin of the plurality of bins uses the computed overall maximum value and the computed overall minimum value, wherein computing the bin number and the cumulative rank value for the quantile uses the overall frequency counter for each bin of the plurality of bins.

25. The method of claim 24, wherein (e) is performed by each thread of the plurality of threads, wherein after (e) and before (f), further comprising computing overall frequency data for each unique value of the variable values from the frequency data for each unique value of the variable values computed by each thread, wherein computing the quantile value associated with the quantile uses the computed overall frequency data.

26. The method of claim 20, wherein before (a), further comprising computing first frequency data for each unique value of the variable values read from the dataset unless a number of the unique values exceeds a predefined maximum number.

27. The method of claim 26, wherein, when the number of the unique values exceeds the predefined maximum number, (a) to (g) are performed.

28. The method of claim 27, wherein, when the number of the unique values does not exceed the predefined maximum number, further comprising:
  computing, by the computing device, a second cumulative rank value using $r=q/N_o$, where r is the second cumulative rank value, q is the quantile, and $N_o$ is the number of the variable values read from the dataset; and
  computing, by the computing device, the quantile value associated with the quantile using the computed first frequency data and the computed second cumulative rank value for the quantile instead of performing (a) to (f).

29. The method of claim 20, wherein computing the frequency counter comprises:
  initializing a current bin number to one and a bin frequency counter to zero;
  (h) reading the variable value and a frequency counter value from the dataset;
  (i) comparing the read variable value to the computed upper bin value and the computed lower bin value of the current bin number;
  (j) when the variable value is not between the computed upper bin value and the computed lower bin value of the current bin number, incrementing the current bin number and repeating (i) to (j);
  (k) when the variable value is between the computed upper bin value and the computed lower bin value of the current bin number, updating the bin frequency counter of the current bin number using the read frequency counter value, and reinitializing the current bin number to one; and
  repeating (h) to (k) until each variable value is read from the dataset.

30. The method of claim 29, wherein computing the bin number and the cumulative rank value for the quantile comprises:
  reinitializing the current bin number to one and a cumulative frequency counter for each bin of the plurality of bins to zero;
  (l) selecting the bin frequency counter of the current bin number;
  (m) computing the cumulative frequency counter of the current bin number by adding the selected bin frequency counter to the cumulative frequency counter of a previous bin relative to the current bin number;
  (n) incrementing the current bin number;
  repeating (l) to (n) until each bin of the plurality of bins is processed;
  reinitializing the current bin number to one;
  initializing a quantile frequency value QF to $QF=q*N_{og}$, where q is the quantile value, and $N_{og}$ is the cumulative frequency counter of a last bin of the plurality of bins;
  (o) comparing the quantile frequency value QF to the computed cumulative frequency counter of the previous bin relative to the current bin number and the computed cumulative frequency counter of the current bin number;
  (p) when the quantile frequency QF is not between the computed cumulative frequency counter of the previous bin relative to the current bin number and the computed cumulative frequency counter of the current bin number, incrementing the current bin number and repeating (o) to (p); and
  when the quantile frequency QF is between the computed cumulative frequency counter of the previous bin relative to the current bin number and the computed cumulative frequency counter of the current bin number, storing the current bin number as the bin number for the quantile, and computing the cumulative rank value for the quantile.

* * * * *

UNITED STATES PATENT AND TRADEMARK OFFICE
CERTIFICATE OF CORRECTION

PATENT NO. : 10,127,192 B1
APPLICATION NO. : 15/961373
DATED : November 13, 2018
INVENTOR(S) : Hu et al.

It is certified that error appears in the above-identified patent and that said Letters Patent is hereby corrected as shown below:

In the Specification

Column 1, Lines 7-10:
Delete the phrase "The present application claims the benefit of 35 U.S.C. § 111(e) to U.S. Provisional Patent Application No. 62/563,142 filed on September 26, 2017, the entire contents of which are hereby incorporated by reference." and replace with -- The present application claims the benefit of 35 U.S.C. § 119(e) to U.S. Provisional Patent Application No. 62/563,142 filed on September 26, 2017, the entire contents of which are hereby incorporated by reference. --.

Signed and Sealed this
First Day of October, 2019

Andrei Iancu
*Director of the United States Patent and Trademark Office*